(12) United States Patent
Leblans

(10) Patent No.: US 6,180,949 B1
(45) Date of Patent: Jan. 30, 2001

(54) PHOTOSTIMULABLE PHOSPHOR SCREEN SUITED FOR DUAL ENERGY RECORDING

(75) Inventor: Paul Leblans, Kontich (BE)

(73) Assignee: Agfa-Gevaert, N.V., Mortsel (BE)

( * ) Notice: Under 35 U.S.C. 154(b), the term of this patent shall be extended for 0 days.

(21) Appl. No.: 09/046,712

(22) Filed: Mar. 24, 1998

Related U.S. Application Data (63) Continuation of application No. 08/765,725, filed on Dec. 30, 1996, now Pat. No. 5,886,354.

(30) Foreign Application Priority Data

Jul. 5, 1994 (EP) .................................................. 94201931
Mar. 21, 1995 (WO) .................................. PCT/EP95/01077

(51) Int. Cl.$^7$ .................................................. G01T 1/105
(52) U.S. Cl. .................................. 250/484.4; 250/483.1; 250/582; 250/370.11
(58) Field of Search .......................... 250/484.4, 483.1, 250/582, 370.11

(56) References Cited

U.S. PATENT DOCUMENTS

| | | | |
|---|---|---|---|
| 4,564,861 | * 1/1986 | Hishinuma et al. | 250/582 |
| 4,950,907 | * 8/1990 | Kuhn | 250/484.4 |
| 5,045,706 | * 9/1991 | Tanaka et al. | 250/483.1 |
| 5,698,857 | * 12/1997 | Lambert et al. | 250/483.1 |

* cited by examiner

*Primary Examiner*—Constantine Hannaher
*Assistant Examiner*—Andrew Israel
(74) *Attorney, Agent, or Firm*—Breiner & Breiner (57) ABSTRACT

A single sheet photostimulable phosphor screen, characterized in that the screen contains in consecutive order (1) a support, (2) a continuous phosphor-containing layer, and permanently and contiguously united therewith (3) a grid structured phosphor-containing layer containing a phosphor different from the phosphor contained in the continuous phosphor-containing layer (2), the grid structured layer (3) containing parallel rows of phosphor-containing stripes or dots, and the different phosphors having a different X-ray absorption capacity with respect to different energy levels of X-ray radiation.

24 Claims, 1 Drawing Sheet

PHOTOSTIMULABLE PHOSPHOR SCREEN SUITED FOR DUAL ENERGY RECORDING

This is a continuation of application Ser. No. 08/765,725 filed Dec. 30, 1996 U.S. Pat. No. 5,886,354.

FIELD OF THE INVENTION

The present invention relates to a single sheet photostimulable phosphor screen suited for dual energy recording of an X-ray pattern containing X-rays of different energy level.

BACKGROUND OF THE INVENTION

Substances showing the phenomenon of luminescence under the influence of X-rays are called phosphors.

According to a classical method of recording and reproducing X-ray images X-ray absorbing phosphor particles are used in phosphor panels or screens to form a radiographs in photographic silver halide emulsion materials sensitive to the fluorescent light promptly emitted by the phosphors where struck by X-rays.

In another radiographic method the principles of which are disclosed in U.S. Pat. No. 3,859,527 photostimulable phosphors are used. Said method comprises the exposure to X-rays of a photostimulable phosphor panel which phosphor stores at least part of the energy of the incident X-rays. At some interval after the exposure, a beam of visible or infra-red light scans the panel to stimulate the release of stored energy as light that is detected and converted into sequential electrical signals which are processable to produce a visible image.

According to the periodical Radiology, September 1983, p. 834 the imaging plate containing a photostimulable phosphor can be used repeatedly to store X-ray images simply by flooding it with light in order to erase the residual energy contained.

In the medical X-ray field it is often necessary to provide information on soft tissue structures and bone-like structures simultaneously. For that purpose "dual-energy" techniques operating in a single shot X-ray exposure with a low energy absorbing front screen and a high energy absorbing back screen separated by X-ray beam hardening filter have been used in classical screen-film assemblage exposure as well as in X-ray imaging with photostimulable storage phosphor screens (ref. Dev P. Chakraborty and Gary T. Barnes in Med. Phys. 16 (1), January/February 1989, p. 7).

The production of low- and high-energy images that are acquired simultaneously avoids image misregistration between the low- and high-energy exposures that could occur by patient-motion.

For the front screen preferentially absorbing the low-energy X-ray photons, useful in the imaging of the structure of soft tissue, low atomic number phosphors are used, whereas the higher energy part of the X-ray beam giving more information on the bone structure is absorbed or stopped in a back screen containing a higher atomic number phosphor.

In the above mentioned periodical Med. Phys. 16 (1), p. 7–8 an energy sensitive cassette for dual-energy mammography has been described wherein the back imaging plate contains a commercial barium fluorobromide phosphor and the front plate contains a similar but no commercially available strontium fluorobromide phosphor. The selection of these phosphors has been made in view of the K edges of Ba and Sr being respectively 37.4 and 16.1.
The K edge of Ba ensures high absorption efficiency of the barium fluorobromide phosphor above 38 keV, whereas the strontium fluorobromide is absorbing effectively in the X-ray region with energies from 15 to 25 keV.

In order to make that the lower energy X-ray radiation cannot interfere with the Ba-type phosphor an interscreen filter, also called midfilter in the form of a copper sheet is used (ref. Medical Physics, Vol. 17, No. 4, July/August 1990, p. 667).

The following phosphor combinations for classical screen-film dual energy X-ray recording were considered: SrFBr/BaFBr, $Y_2O_2S/Gd_2O_2S$ and $Y_2O_2S/LuTaO_4$.

In U.S. Pat. No. 5,051,589 a stimulable phosphor sheet suited for subtraction radiography is described wherein different stimulable phosphors are mixed together or take the form of a layer, wherein at least a first stimulable phosphor is represented by the formula GdOCl:Ce and a second stimulable phosphor is represented by the formula $SrFCl:Eu^{2+}$. Said phosphors have different X-ray absorption characteristics which represent different absorptivity with respect to energy levels of X-ray radiation and have different response speeds with regard to stimulating rays which cause them to emit light in proportion to the amounts of X-ray energy stored.

In published European patent application 0 112 469 corresponding with U.S. Pat. No. 4,855,598 an X-ray pattern subtraction method is described comprising steps of:
(i) obtaining at least two X-ray images of an object including a specific structure exhibiting radiation energy absorption characteristics different from the radiation energy absorption characteristics of the other structure in said object,
(ii) extracting an image of said specific structure by subtraction of one of said images from the other one, characterized by
(iii) simultaneously exposing a plurality of stimulable phosphor sheets (A,B; A,B,B'; A,B,C) which are overlaid one upon another to provide a composite member, to the X-ray radiation passing through said object, to store radiation images in the respective stimulable phosphor sheets (A,B; A,B,B'; A,B,C) so that image information is recorded in a stimulable phosphor sheet (B; B,B'; B,C) positioned farther from said object in such a way that, at least at the area of the record corresponding to said specific structure, a low energy component of the radiation is recorded at a lower intensity than in a stimulable phosphor sheet (A) positioned closer to said object,
(iv) scanning the respective stimulable phosphor sheets (A,B; A,B,B'; A,B,C) with stimulating rays to sequentially release the radiation energy stored in the stimulable phosphor sheets as light emission.
(v) photoelectrically detecting the emitted light and converting it to digital image signals representing the respective X-ray radiation images,
(vi) providing at least two sets of digital image signals, representing at least two respective X-ray radiation images, for use in subtraction processing, and
(vii) extracting an image of said specific structure by subtraction processing of said sets of signals, i.e. multiplying digital image signals of corresponding picture elements by weight factors and subtracting said weighted signals.

For the use in image subtraction of weight factors for bones and soft tissue reference is also made to U.S. Pat. No. 5,049,748.

As described by John M. Boone, Melvin Tecotzky and Guillermo M. Alexander in the article "Binary Screen Detector System for Single-Pulse Dual-Energy Radiography" published in the periodical Radiology, June 1992; p. 863 the read out and digitization of images obtained from stacked detector screens during imagewise X-ray exposure proceeeds after separation of the stacked elements. During that separation and separate read out the spatial alignment between the images and detectors may be lost.

Published European patent application 0 126 564 and corresponding U.S. Pat. No. 4,752,557 relates to a radiation image storage panel and its preparation in which a photostimulable phosphor is provided on a substrate with a honeycomb structure constituted of a number of cells partitioned by wall members filled with the stimulable phosphor. According to said documents the radiation image storage panel can give images of markedly improved sharpness.

The use of said panel is separately recording a higher and lower energy level pattern from a single X-ray pattern has neither been disclosed nor suggested in said U.S. Pat. No. 4,752,557.

OBJECTS AND SUMMARY OF THE INVENTION

It is an object of the present invention to provide a single sheet photostimulable phosphor screen suited for yielding a higher and lower energy level pattern from a single X-ray pattern and suited for forming a subtraction pattern without misregistration.

It is another object of the present invention to provide a "dual-energy" recording technique operating with said single sheet phosphor screen in a single shot X-ray exposure avoiding problems of misregistration in recording of higher and lower energy level X-ray patterns and in their reading out in the form of photostimulated light.

Other objects and advantages of the present invention will become clear from the following description and drawing.

The present invention provides a single sheet photostimulable phosphor screen, characterized in that said screen contains in consecutive order (1) a support, (2) a continuous phosphor-containing layer, and permanently and contiguously united therewith (3) a grid structured phosphor-containing layer containing a phosphor different from the phosphor contained in said continuous phosphor-containing layer (2), said grid structured layer (3) containing parallel rows of phosphor-containing stripes or dots, and said different phosphors having a different X-ray absorption capacity with respect to different energy levels of X-ray radiation.

In a first modified embodiment of said single sheet photostimulable phosphor screen said continuous phosphor-containing layer (2) has been replaced by a phosphor-containing layer (4) having a grid structure and wherein the grid structured layers (3) and (4) each have parallel rows of phosphor-containing stripes or dots spatially arranged in such a way that the rows of phosphor-containing layer (3) are not overlapping with the rows of phosphor-containing layer (4), and phosphor(s) of said layer (3) is (are) different from phosphor(s) of said layer (4) by having different X-ray absorption capacity with respect to different energy levels of X-ray radiation.

In a second modified embodiment of said single sheet photostimulable phosphor screen said continuous phosphor-containing layer (2) has been replaced by a phosphor-containing layer (4) having a grid structure and wherein the grid structured layers (3) and (4) each have parallel rows of phosphor-containing stripes or dots spatially arranged in such a way that the rows of phosphor-containing layer (3) are crossing the rows of phosphor-containing layer (4), and phosphor(s) of said layer (3) is (are) different from phosphor (s) of said layer (4) by having different X-ray absorption capacity with respect to different energy levels of X-ray radiation.

Further in accordance with the present invention an X-ray radiation recording process is provided comprising the consecutive steps of:

(1) exposing a single sheet phosphor screen to an X-ray pattern obtained by passing X-rays of different energy level through an object, said phosphor screen being a phosphor screen according to the present invention as described above, (2) separately scanningwise photostimulating the different phosphors in said single sheet phosphor screen, (3) separately photo-electronically detecting the fluorescent light emitted by said different phosphors and providing two sets of digital image signals corresponding with the detected fluorescent light levels, and optionally (4) extracting an image of specific structure by subtraction processing of said sets of signals.

BRIEF DESCRIPTION OF THE DRAWINGS

In the accompanying FIGS. 1 to 3 cross-sectional views are given respectively of the above mentioned main embodiment and first modified embodiment of a single sheet photostimulable phosphor screen according to the present invention.

In the accompany FIG. 4 a top view is given of a single sheet photostimulable phosphor screen according to the above mentioned second modified embodiment of the present invention.

DETAILED DESCRIPTION OF THE INVENTION

Figure 1:
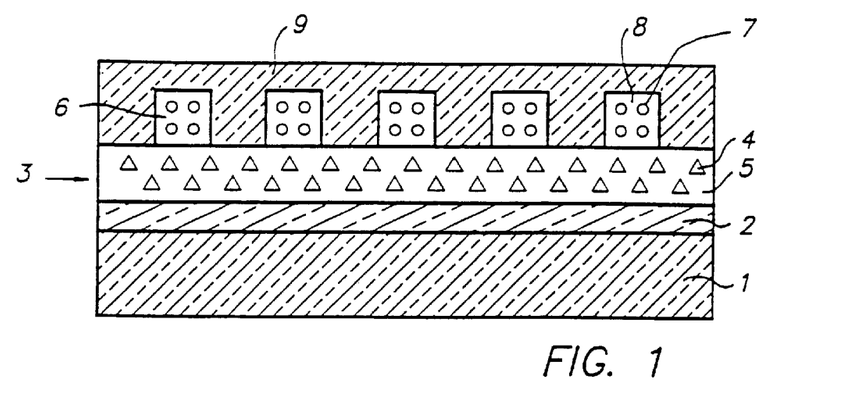

As illustrated in FIG. 1 according to the main embodiment of the present invention a single sheet photostimulable phosphor screen contains a transparent support 1 coated with a transparent subbing layer 2. Photostimulating phosphor particles 4 dispersed in polymeric binder 5 are present in a continuous (common) phosphor layer 3. Said phosphor layer 3 stands in permanent contact with a gridlike structure in the form of parallel stripes 6 containing photostimulable phosphor particles 7 different from photostimulable phosphor particles 4 in a polymeric binder 8. Optionally said relief structure has been coated with a uniformly applied light-transparent covering layer 9 serving as protective coating filling the voids between the stripes 6.

The photostimulable phosphors contained in said phosphor layer 3 and in said parallel stripes 6 have a different X-ray absorption capacity with respect to different energy levels contained in an X-ray pattern.

Figure 2:
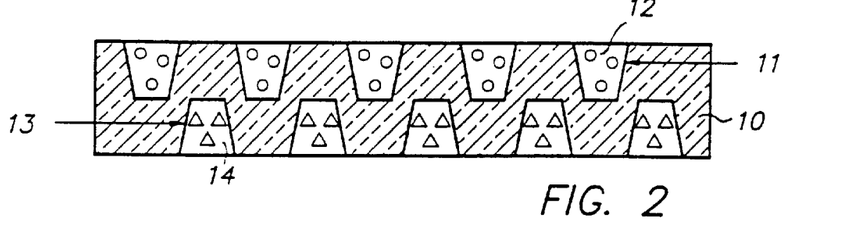

As illustrated in FIG. 2 a phosphor screen according to the present invention contains a transparent self-supporting layer 10 having at one side parallel grooves 11 filled with a phosphor-binder mixture 12 and at the opposite side parallel grooves 13 filled with another phosphor-binder mixture 14, the phosphor present in the grooves at one side of said self-supporting layer being different from the phosphor present in the grooves of the opposite side of said self-supporting support.

The grooves 11 and 13 are formed e.g. by milling and do not overlap or overlap only partially (dotwise) by crossing each other.

The photostimulable phosphors contained respectively in said grooves 11 and 13 have a different X-ray absorption capacity with respect to different energy levels contained in an X-ray pattern.

Optionally the inner walls of the grooves (11 and 13) are provided e.g. by vapor deposition, with an opaque material absorbing or reflecting photostimulating light (excitation light), e.g. the innerwalls are provided with vapor-deposited aluminium giving them a mirror finishing by which the light emitted by photostimulation is reflected, improving thereby the sensitivity of the system.

Figure 3:
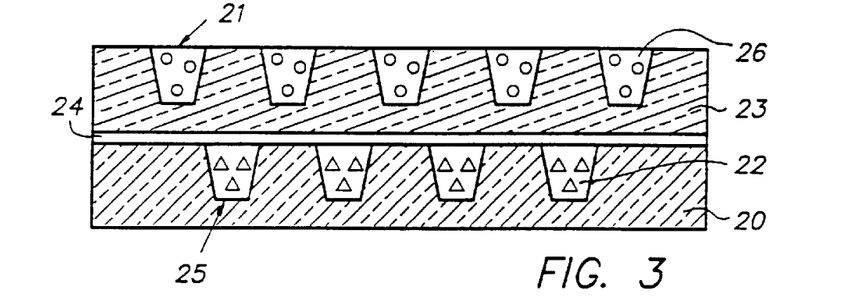

As illustrated in FIG. 3 a phosphor screen according to the present invention 8 contains a transparent support (i) indicated by numeral 20 having parallel grooves 25 filled with a phosphor-binder mixture 22, which transparent support (i) has been laminated through a thin clear adhesive layer 24 with a transparent self-supporting layer (ii) indicated by numeral 20 which self-supporting layer (ii) has parallel grooves 21 filled with a phosphor-binder mixture 26.

The photostimulable phosphors contained respectively in said grooves 21 and 25 have a different X-ray absorption capacity with respect to different energy levels contained in an X-ray pattern.

Figure 4:
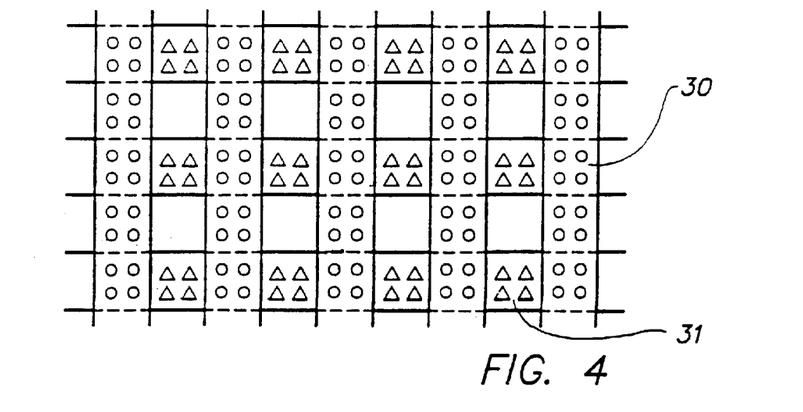

FIG. 4 illustrates by top view an embodiment of a single sheet photostimulable phosphor screen having crossing grooves 30 and 31 in which the photostimulable phosphors are different. Scanningwise read out of such screen proceeds by photostimulating the phosphor particles contained in grooves 30 along the axis of said grooves whereby a continuous (linetype) signal is obtained. Scanningwise read out of the phosphor particles contained in the grooves 31 in a direction perpendicular to the grooves 31 yields a discontinuous (dottype) signal.

According to a preferred embodiment of a single sheet photostimulable phosphor screen according to the present invention one of said phosphor-containing layers contains a photostimulable phosphor mainly containing barium as host metal and the other phosphor-containing layer contains a photostimulable phosphor mainly containing strontium as host metal.

Thus, in a "dual energy" recording method according to the present invention the higher energy level X-rays are absorbed preferably by a photostimulable phosphor mainly containing barium as host metal whereas the lower energy level X-rays are absorbed by a photostimulable phosphor mainly containing strontium as host metal. For example, said phosphor is a $Eu^{2+}$ doped barium fluorohalide as described e.g. in U.S. Pat. No. 4,239,968, EP 0 021 342, EP 0 345 903 or in published Euorpean patent application 0 533 233.

A preferred photostimulable phosphor mainly containing strontium as host metal is a phosphor corresponding to the following empirical formula (I):

$$Sr_{(1-x-y)}Mg_xCa_yF_{(2-a-b)}BraCl_b:zA \qquad (I)$$

wherein:
x is in the range $0 \leq x \leq 0.10$, preferably $0 \leq x \leq 0.03$;
y is in the range $0 \leq \gamma x \leq 0.10$, preferably $0 \leq \gamma x \leq 0.03$;
a is in the range $0 \leq a \leq 1.30$, preferably $0.8 \leq a \leq 1.20$;
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

Preferably in said phosphor fluorine is present stoichiometrically in a larger atom % than bromine or chlorine taken alone or bromine combined with chlorine.

A photostimulable phosphor according to said empirical formula (I) can be prepared by using as starting materials:
(1) strontium fluoride;
(2) magnesium halide optionally in combination with calcium halide (the halide can be partially fluoride in combination with chloride and/or bromide);
(3) a strontium halide (including strontium chloride and bromide);
(4) at least one A containing compound selected from the group consisting of europium halide, europium oxide, europium nitrate and
europium sulphate, optionally in admixture with at least one of Y, Tb, Ce, Tm, Dy, Pr, Ho, Nd, Yb, Er, La, Gd and Lu oxides or salt, preferably fluorides.

Preferably the preparation proceeds by using ammonium halide, e.g. $NH_4Br$, $NH_4Cl$ and/or $NH_{4f}$ in the firing mixture as a co-reactant for introducing in the phosphor the halide ion of the ammonium salt.

The preparation of said phosphor may proceed analogously to the preparation of the barium(strontium) fluorohalide phosphor described in European patent 345 903.

The firing of the above halides proceeds preferably at temperatures between 650 and 850° C. in a reducing atmosphere. The reducing atmosphere is a mixture of hydrogen with inert gas, e.g. argon or nitrogen or is formed in situ by reaction of charcoal and water vapour to form a mixture of hydrogen and carbon monoxide or hydrogen and carbon dioxide, and/or by the use of an ammonium halide.

The reducing atmosphere reduces most or all of the present trivalent europium to divalent europium.

After the firing is completed the product obtained is pulverized. The pulverized product may be further fired. Multiple firing may be advantageous to improve the homogeneity and stimulation properties of the phosphor.

Other phosphors with relatively low K edge value are the following:
1. M′X:xBi, wherein M′=Rb and X=Cl, Br and/or I;
2. RbX:xTl, wherein X=Br and/or I;
3. YOX:zA, wherein X=Cl and/or Br and A=Ce or Tb;
4. $Sr_3(PO_4)_2:Eu^{2+}$;
5. $Sr_5(PO_4)_3X:Eu^{2+}$;
6. $Sr_2PO_4X \; xEu^{2+}$;
7. $Sr_2M^{II}Si_2O_7 \; xCe^{3+}$;
8. $Sr_5SiO_4X_6:Eu^{2+}$, wherein X is halogen;
9. $Y_2SiO_5$:aTb, bCe;
10. $Y_2SiO_5:Ce^{3+}, Sm^{3+}$;
11. $Sr_2BO_3X:xEu^{2+}$, wherein X=Cl, Br and/or I;
12. $Sr_{2-x}(B_5O_9)_{5-y/2}X_y:D_x$, X is haolgen and $D=Eu^{2+}$, $Ce^{3+}$;

The photostimulable phosphor particles applied according to the present invention may have an average grain size in the range of 1 to 30 $\mu$m, the larger grains offering a better sensitivity but less image resolution. It is not preferred to use phosphor particles having a grain size larger than the width of the line structures or diameter of the dot structures.

In the production of a "dual energy" phosphor panel the photostimulable phosphors are used preferably in dispersed state in a polymeric organic binder although some phosphors such as the alkali metal halide phosphors disclosed e.g. in (PCT) WO 87 004177 can be applied by vacuum-deposition.

Suitable binders for forming a binder layer incorporating the photostimulable phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

In view of the sensitivity and sharpness of the radiation image storage panel containing photostimulable phosphor particles dispersed in a binder, the binder should preferably be present in an amount as small as possible, but is normally within the range from 0.03 to 0.2 parts by weight with respect to the binder content.

The coverage of the phosphor is preferably in the range from about 300 to 1500 g/m2. The thickness of the continuous phosphor layer and of the relief structure of the grid structured phosphor layer is preferably in the range of 0.05 to 0.5 mm.

The dimensions of the phosphor-containing portions and interstitial portions (lines or dots) of the grid structured screen layers are as small as possible for obtaining a high image resolution. In practice the depth of the cells filled with phosphor or phosphor-binder mixture is 30 to 1000 $\mu$m, the width of the cells is preferably within the range of 10 to 600 $\mu$m and the width (thickness) of the partitioning wall members is preferably in the range of 10 to 300 $\mu$m (ref. U.S. Pat. No. 4,752,557).

The continuous phosphor layer of the photostimulable dual energy phosphor panel according to the present invention is coated on a support sheet by coating techniques known to those skilled in the art.

The production of the grid structured phosphor layers may proceed in different ways.

According to a first embodiment a grid structured phosphor layer for use in a photostimulable phosphor screen according to the present invention is formed by filling the grooves or pits of a transparent resin support with a phosphor-binder mixture. The grooves or pits can be obtained by casting the resin material in a mother mold as described e.g. in published European patent application 0 126 564 and corresponding U.S. Pat. No. 4,752,557, which documents as DE 4,142,150 relate to grid structured phosphor screens produced through molding. In another way the grooves are obtained by milling a continuous hardened phosphor coating that is removed linewise mechanically leaving a linewise relief of the phosphor coating.

According to a second embodiment a structured phosphor layer for use in a photostimulable phosphor screen according to the present invention is formed according to a technique described in DE 39 09 450 wherein a fine metalgrid is filled with phosphor particles or a phosphor-binder mass. The supported grid-structures are covered with a protective transparent foil, e.g. foil of polyimide. Such screens have a very good mechanical stability and life time. The metallic separating walls of these "chambered" phosphor structures have a thickness of about 5 $\mu$m, a height of about 300 $\mu$m and the micro-chambers filled with phosphor have an inner diameter of about 30 $\mu$m.

According to a third embodiment a grid structured phosphor layer is obtained using a peel-off or wash-off technique combined with a phosphor resin binder or composition that is photosoluble or photohardenable.

Photoresist resin binders suitable for forming pigmented relief structures are known for the production of photopolymer printing plates as described e.g. by Kurt I. Jacobson-Ralph E. Jacobson in the book "Imaging Systems"—The Focal Press—London and New York (1976), p. 181–222.

Suitable support materials for use in the production of dual energy panels according to the present invention are made of a film forming organic resin, e.g. polyethylene terephthalate, but paper and cardboard supports optionally coated with a resin layer such as an alpha-olefinic resin layer are also particularly useful. Further glass and metal supports are used in certain circumstances.

For producing a photostimulable phosphor coating composition the phosphor particles are intimately dispersed in a solution of film-forming resin binder in an organic solvent, e.g. 2-methoxy-propanol or ethyl acetate. The coating of said composition may proceed according to any usual technique, e.g. by spraying, dip-coating or doctor blade coating. After coating, the solvent(s) of the coating mixture is (are) removed by evaporation, e.g. by drying in a hot (60° C.) air current.

Solvent-less coating may be carried out by using UV or electron beam (EE) curable binder compositions as described e.g. in Research Disclosure December 1977, item 16435.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided on the support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described in U.S. Pat. No. 4,380,702.

Optionally a light-absorbing layer is provided on the support or in the support itself to avoid reflection and scattering of light at the interface of the support and the most close phosphor-containing layer, thereby increasing the image resolution of the photostimulable phosphor screen.

Since in the above described X-ray recording system operating with photostimulable radiographic screens the screens are used repeatedly, it is important to provide them with an adequate topcoat for protecting the phosphor-containing layers from mechanical and chemical damage. This is particularly important for photostimulable radiographic screens where each screen normally is not encased in a cassette.

A protective layer can be coated onto the outermost phosphor-containing layer or relief structure by directly applying thereto a coating solution containing a film-forming organic solvent-soluble polymer such as nitrocellulose, ethylcellulose or cellulose acetate or poly (meth)acrylic resin and removing the solvent by evaporation. According to another technique a clear, thin, tough, flexible, dimensionally stable polyamide film is bonded to the phosphor layer as described in published EP 00 392 474.

According to a further known technique a protective overcoat is produced with a radiation-curable composition. Use of a radiation curable coating as protective toplayer in a X-ray conversion screen is described e.g. in EP 209 358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

The photostimulation of the $Eu^{2+}$ doped barium fluorohalide or strontium fluorohalide phosphor proceeds with good X-ray conversion efficiency results with light in the wavelength range of 450 to 650 nm. The emitted fluorescent light produced by photostimulation has a peak wavelength at about 390 nm. Particularly useful photostimulating light emitting light sources for the scanningwise reading out of the dual energy phosphor panels according to the present invention are e.g. the frequency doubled (532 nm) solid state Nd-YAG laser, an argon ion laser wherefrom either the 488 nm line or 514.5 nm emission line is used, and a Ne-Ne gas laser emitting at 633 nm.

The X-ray energy stored in the photostimulable phosphors having different X-ray absorption capacity with respect to different energy levels contained in the applied X-ray pattern are read out either simultaneously or sequentially.

Sequential read out of the different phosphor layers of the single phosphor sheet or panel according to the present invention may proceed using encoder marks on the phosphor panel in order to direct a first laser beam scanningwise on the area of the phosphor sheet or panel covered by the phosphor having higher absorption capacity for higher energy X-rays, and to direct thereupon a second laser beam on the area of the phosphor panel covered by the phosphor having absorption capacity primarily for the lower energy level X-rays of the X-ray exposure pattern.

So, according to a particular embodiment a single sheet phosphor screen according to the present invention contains separate tracks of encoder marks for controlling the position of a first and second read out laser beam used for reading out separately and sequentially said different phosphors after there exposure to an X-ray pattern.

The sequential read out of the different X-ray energy patterns proceeds preferably from the same side of the phosphor panel or sheet and may proceed by moving the phosphor sheet or panel to-and-fro under laser beam scanning optics and photo-electronic detection optics.

The encoder marks are optically detectable and may be perforations, optical windows or light-reflecting pits or spots forming separate code tracks in the panel that control separately the position of the first and second read out laser beams. The use of coder tracks for the positioning of a laser beam is known from optical disk technology and is described e.g. in U.S. Pat. No. 4,400,443.

Scanningwise read out of a photostimulable phosphor sheet by means of laser beam and photoelectronic detection is illustrated in FIG. 1 of published European Patent Application 0 532 800.

Simultaneous read out of a phosphor panel may proceed e.g. by exposing the continuous phosphor layer illustrated in FIG. 1 through the transparent support from the rear side of the panel and the grid structured phosphor layer from the front side, optionally using the same laser source and mirror optics for deflecting the laser light scanningwise to said front and rear side.

In order to make that reflected stimulating light does not enters the photo-electronic detector together with emitted fluorescent light (stimulated light) filter means are used which may be cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973), p. 264—326.

Shortwave pass filters that transmit the shorter wavelengths and reject the longer wavelengths are listed in Table 4.12 of said SPSE Handbook.

Bandpass filters that transmit or reject only a limited band of wavelengths are listed in Tables 4.13 and 4.14 respectively. Tables of many selected long-wave, shortwave pass, and bandpass filters, both liquid and solid, for wavelengths from 150 to 350 nm, are given by W. Summer, Photo Sensitors, Chapman & Hall, London, 1957, chap. 9.

The fluorescent light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image current enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversation of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

What is claimed is:

1. A method for dual energy recording of an X-ray pattern containing X-rays of different energy level the consecutive steps of:

(1) exposing a single sheet phosphor screen to an X-ray pattern of different energy level passing through an object, said phosphor screen containing in consecutive order a support, a first continuous phosphor-containing layer with a phosphor having a first X-ray absorption capacity with respect to different energy levels of X-ray radiation, and permanently and contiguously united therewith a second phosphor-containing layer having a grid structure, with parallel rows of phosphor-containing stripes or dots with a phosphor having a second X-ray absorption capacity, said second X-ray absorption capacity being different from said first X-ray absorption capacity, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal, and wherein said phosphor containing strontium as host metal corresponds to the following empirical formula (I):

$$Sr_{(1-x-y)}Mg_xCa_yF_{(2-a-b)}BraCl_b:zA \qquad (I)$$

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu, (2) separately scanning-wise photo-stimulating said phosphors in said single sheet phosphor screen, (3) separately photo-electronically detecting fluorescent light emitted by said different phosphors and providing two sets of digital image signals corresponding with said detected fluorescent light levels, and optionally and (4) extracting an image of specific structure by subtraction processing of said sets of signals.

2. A method according to claim 1, wherein said phosphor containing barium as host metal is a Eu2+ doped barium fluorohalide.

3. A method for dual energy recording of an X-ray pattern containing X-rays of different energy level the consecutive steps of:

(1) exposing a single sheet phosphor screen to an X-ray pattern of different energy level passing through an object, said phosphor screen containing in consecutive order a support, a first phosphor-containing layer having a grid structure, with parallel rows of phosphor-containing stripes or dots with a phosphor having a first X-ray absorption capacity with respect to different energy levels of X-ray radiation, and a second phosphor-containing layer having a grid structure, with parallel rows of phosphor-containing stripes of dots with a phosphor having a second X-ray absorption capacity, wherein said second X-ray absorption capacity is different from said first X-ray absorption capacity, and said rows of said first layer are spatially arranged in such a way that said rows do not overlap with said rows in said second layer and wherein said rows of said first layer are spatially arranged in such a way that said rows cross said rows in said second layer, (2) separately scanning-wise photo-stimulating said phosphors in said single sheet phosphor screen,

(3) separately photo-electronically detecting fluorescent light emitted by said different phosphors and providing two sets of digital image signals corresponding with said detected fluorescent light levels, and optionally and (4) extracting an image of specific structure by subtraction processing of said sets of signals.

4. A method according to claim 3, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal.

5. A method according to claim 4, wherein said phosphor containing barium as host metal is a Eu2+ doped barium fluorohalide.

6. A method according to claim 4, wherein said phosphor containing strontium as host metal corresponds to the following empirical formula (I):

(I)

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

7. A method according to claim 3, wherein said first phosphor first X-ray absorption capacity with respect to different energy levels of X-ray radiation mainly contains barium as host metal and said second phosphor with said secondary X-ray absorption capacity with respect to different energy levels of X-ray radiation mainly contains strontium as host metal.

8. A method according to claim 7, wherein said phosphor containing barium as host metal is a $Eu^{2+}$ doped barium fluorohalide.

9. A method according to claim 7, wherein said phosphor containing strontium as host metal corresponds to the following empirical formula (I):

(I)

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

10. A method for dual energy recording of an X-ray pattern containing X-rays of different energy level the consecutive steps of:

(1) exposing a single sheet phosphor screen to an X-ray pattern of different energy level passing through an object, said phosphor screen comprising a transparent self-supporting layer with a first and second face, having on said first face parallel grooves filled with a first phosphor-binder mixture with a phosphor having a first X-ray absorption capacity with respect to different energy levels of X-ray radiation and on said second face parallel grooves filled with a second phosphor-binder mixture, with a second X-ray absorption capacity with respect to different energy levels of X-ray radiation, different from said first X-ray absorption capacity and wherein said grooves on said first face are spatially arranged in such a way that said grooves do not overlap with said grooves in said second face and wherein said grooves on said first face are spatially arranged in such a way that said grooves cross said grooves in said second face, (2) separately scanning-wise photo-stimulating said phosphors in said single sheet phosphor screen,

(3) separately photo-electronically detecting fluorescent light emitted by said different phosphors and providing two sets of digital image signals corresponding with said detected fluorescent light levels, and optionally and (4) extracting an image of specific structure by subtraction processing of said sets of signals.

11. A method according to claim 10, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal.

12. A method according to claim 11, wherein said phosphor containing barium as host metal is a Eu2+ doped barium fluorohalide.

13. A method according to claim 11, wherein said phosphor containing strontium as host metal corresponds to the following empirical formula (I):

(I)

wherein:
x is in the range $0 \leq x \leq 0.10$, y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

14. A method according to claim 10, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal.

15. A method according to claim 14, wherein said phosphor containing barium as host metal is a Eu2+ doped barium fluorohalide.

16. A method according to claim 14, wherein said phosphor containing strontium as host metal corresponds to the following empirical formula (I):

$$Sr_{(1-x-y)}Mg_xCa_yF_{(2-a-b)}BraCl_b:zA \qquad (I)$$

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

17. A method for dual energy recording of an X-ray pattern containing X-rays of different energy level the consecutive steps of:

(1) exposing a single sheet phosphor screen to an X-ray pattern of different energy level passing through an object, said phosphor screen comprising a transparent support with a first and a second face, at one of said faces having parallel grooves filled with a first phosphor-binder mixture including a phosphor with a first X-ray absorption capacity with respect to different energy levels of X-ray radiation, laminated together with a transparent self-supporting layer with a first and a second face, at one of said faces having parallel grooves filled with a second phosphor-binder mixture including a phosphor with a second X-ray absorption capacity with respect to different energy levels of X-ray radiation, different from said first X-ray absorption capacity, wherein said grooves on said face of said transparent support are spatially arranged in such a way that said grooves do not overlap with said grooves on said face of said self supporting layer, (2) separately scanning-wise photo-stimulating said phosphors in said single sheet phosphor screen, (3) separately photo-electronically detecting fluorescent light emitted by said different phosphors and providing two sets of digital image signals corresponding with said detected fluorescent light levels, and optionally and (4) extracting an image of specific structure by subtraction processing of said sets of signals.

18. A method according to claim 17, wherein said grooves on said first face are spatially arranged in such a way that said grooves cross said grooves in said second face.

19. A method according to claim 17, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal.

20. A method according to claim 19, wherein said phosphor containing barium as host metal is a Eu2+ doped barium fluorohalide.

21. A method according to claim 19, wherein said phosphor containing strontium as host metal corresponds to the following empirical formula (I):

$$Sr_{(1-x-y)}Mg_xCa_yF_{(2-a-b)}BraCl_b:zA \qquad (I)$$

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

22. A method according to claim 18, wherein said first phosphor first X-ray absorption capacity with respect to different energy levels of X-ray radiation mainly contains barium as host metal and said second phosphor with said second X-ray absorption capacity with respect to different energy levels of X-ray radiation mainly contains strontium as host metal.

23. A method according to claim 22, wherein said phosphor containing barium as host metal is a Eu2+ doped barium fluorohalide.

24. A method according to claim 22, wherein said phosphor containing strontium as host metal corresponds to the following empirical formula (I):

$$Sr_{(1-x-y)}Mg_xCa_yF_{(2-a-b)}BraCl_b:zA \qquad (I)$$

wherein:
x is in the range $0 \leq x \leq 0.10$,
y is in the range $0 \leq x \leq 0.10$,
a is in the range $0 \leq a \leq 1.30$,
b is in the range $0 \leq b \leq 1$;
z is in the range $10^{-7} \leq z \leq 0.15$, and
A is $Eu^{2+}$ or $Eu^{2+}$ together with one or more of the co-dopants selected from the group consisting of $Eu^{3+}$, Y, Tb, Ce, Tm, Dy, Pr, Ho, Nd, Yb, Er, La, Gd and Lu.

* * * * *

UNITED STATES PATENT AND TRADEMARK OFFICE
CERTIFICATE OF CORRECTION

PATENT NO.   : 6,180,949 B1
DATED        : January 30, 2001
INVENTOR(S)  : Paul Leblans It is certified that error appears in the above-identified patent and that said Letters Patent is hereby corrected as shown below:

Column 1,
Line 17, "a" should be deleted.

Column 5,
Line 48, "$Sr_{(1-x-y)}Mg_xCa_yF_{(2-a-b)}BraCl_b: zA$" should read -- $Sr_{(1-x-y)}Mg_xCa_yF_{(2-a-b)} Br_aCl_b: zA$ --.

Column 8,
Line 9, "(EE)" should read -- (EB) --.
Line 25, insert -- e.g. -- before "U.S. Pat. No. 4,380,702".

Column 9,
Line 1, "Ne-Ne" should read -- He-Ne --.
Line 62, "350" should read -- 3500 --.

Column 10,
Line 3, "current" should read -- contrast --.

Column 10, claim 1,
Line 49, "$Sr_{(1-x-y)}Mg_xCa_yF_{(2-a-b)}BraCl_b: zA$" should read -- $Sr_{(1-x-y)}Mg_xCa_yF_{(2-a-b)} Br_aCl_b: zA$ --.

Column 11, claim 6,
Line 49, "$Sr_{(1-x-y)}Mg_xCa_yF_{(2-a-b)}BraCl_b: zA$" should read -- $Sr_{(1-x-y)}Mg_xCa_yF_{(2-a-b)} Br_aCl_b: zA$ --.

Column 11, claim 7,
Line 65, "secondary" should read -- second --.

Column 12, claim 9,
Line 8, "$Sr_{(1-x-y)}Mg_xCa_yF_{(2-a-b)}BraCl_b: zA$" should read -- $Sr_{(1-x-y)}Mg_xCa_yF_{(2-a-b)} Br_aCl_b: zA$ --.

Column 12, claim 13,
Line 64, "$Sr_{(1-x-y)}Mg_xCa_yF_{(2-a-b)}BraCl_b: zA$" should read -- $Sr_{(1-x-y)}Mg_xCa_yF_{(2-a-b)} Br_aCl_b: zA$ --.

UNITED STATES PATENT AND TRADEMARK OFFICE
CERTIFICATE OF CORRECTION

PATENT NO. : 6,180,949 B1
DATED : January 30, 2001
INVENTOR(S) : Paul Leblans

It is certified that error appears in the above-identified patent and that said Letters Patent is hereby corrected as shown below:

Column 13, claim 16,
Line 22, "$Sr_{(1-x-y)}Mg_xCa_yF_{(2-a-b)}BraCl_b: zA$" should read -- $Sr_{(1-x-y)}Mg_xCa_yF_{(2-a-b)}Br_aCl_b: zA$ --.

Column 14, claim 21,
Line 20, "$Sr_{(1-x-y)}Mg_xCa_yF_{(2-a-b)}BraCl_b: zA$" should read -- $Sr_{(1-x-y)}Mg_xCa_yF_{(2-a-b)}Br_aCl_b: zA$ --.

Column 14, claim 24,
Line 47, "$Sr_{(1-x-y)}Mg_xCa_yF_{(2-a-b)}BraCl_b: zA$" should read -- $Sr_{(1-x-y)}Mg_xCa_yF_{(2-a-b)}Br_aCl_b: zA$ --.

Signed and Sealed this

Eleventh Day of December, 2001

Attest:

NICHOLAS P. GODICI
Attesting Officer
*Acting Director of the United States Patent and Trademark Office*